Figure 1:
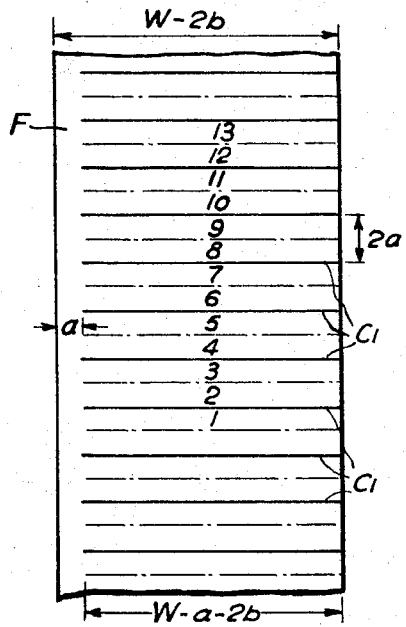

March 20, 1962 P. EISLER 3,026,234
LAMINATES OF INSULATING MATERIAL EMBODYING ELECTRICALLY
CONDUCTIVE PATTERNS AND METHOD AND
APPARATUS FOR PRODUCING SAME
Filed Jan. 12, 1959 5 Sheets-Sheet 1

INVENTOR
Paul Eisler
BY
ATTORNEY

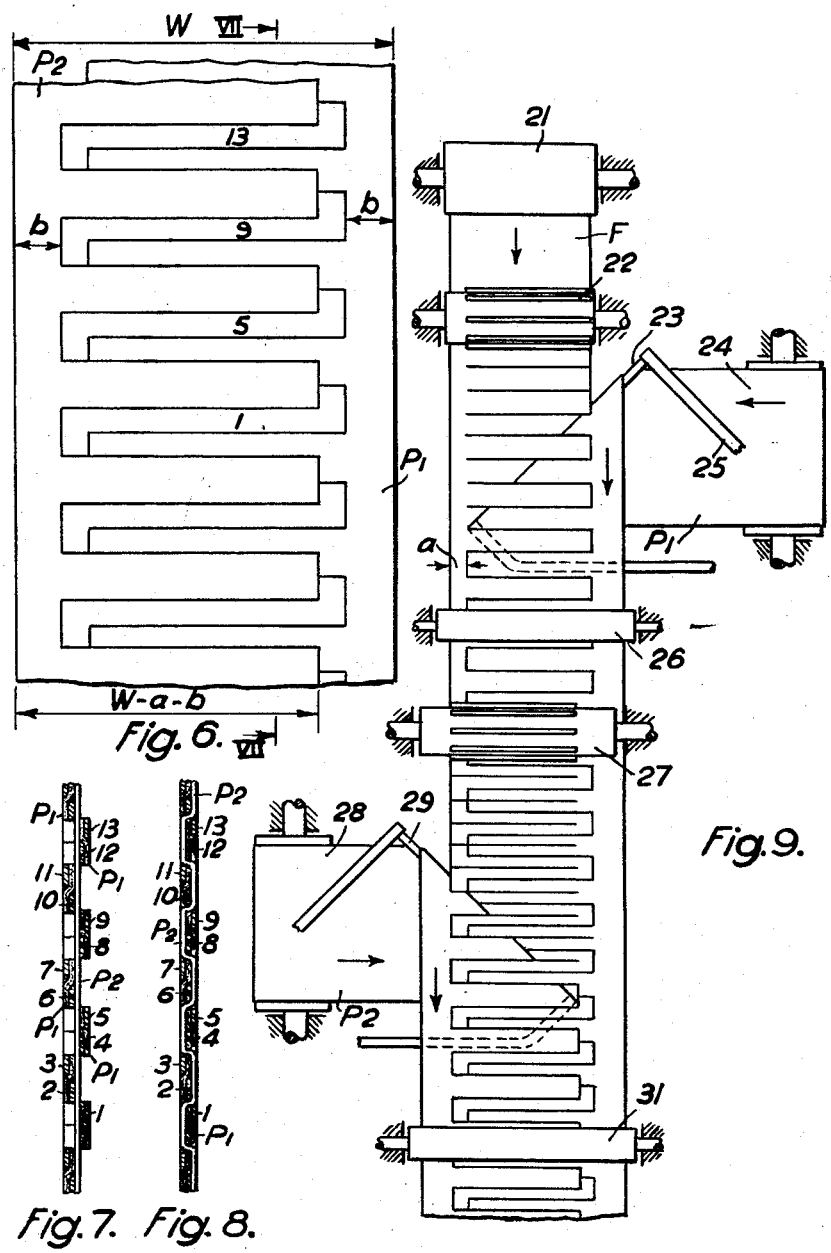

March 20, 1962 P. EISLER 3,026,234
LAMINATES OF INSULATING MATERIAL EMBODYING ELECTRICALLY
CONDUCTIVE PATTERNS AND METHOD AND
APPARATUS FOR PRODUCING SAME
Filed Jan. 12, 1959 5 Sheets-Sheet 3
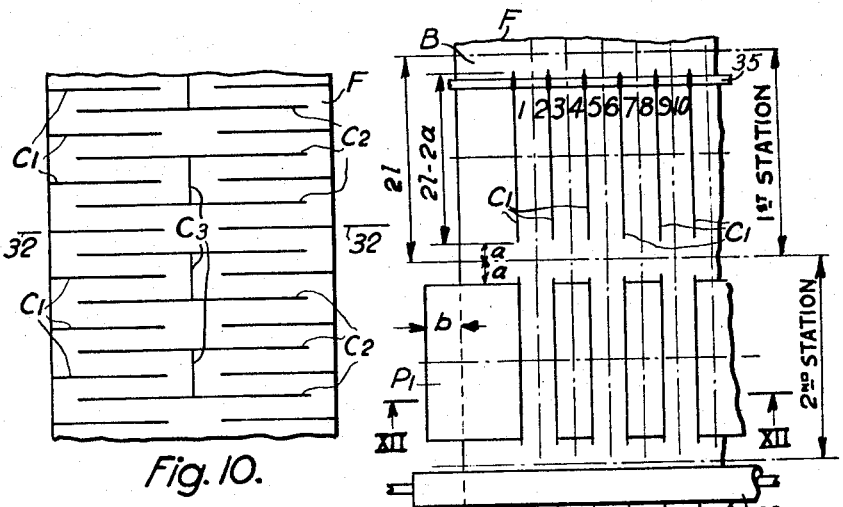
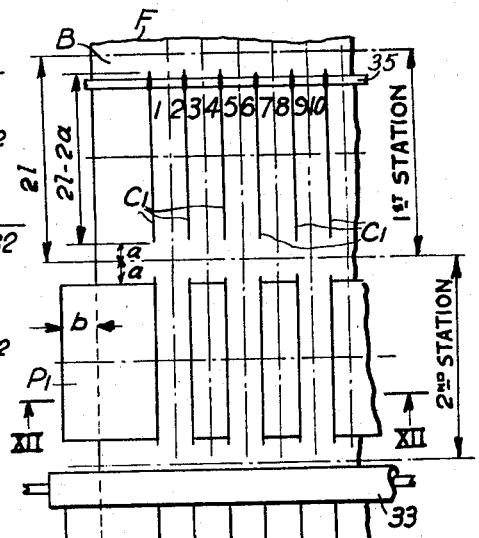
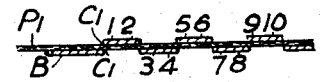
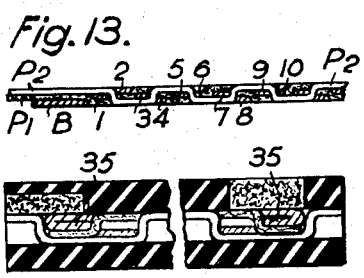
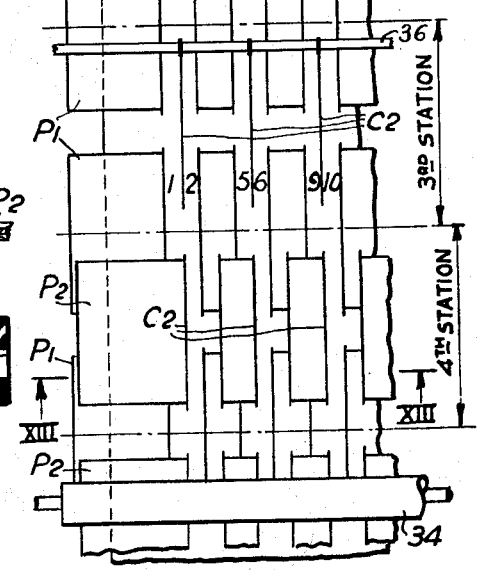
Fig. 10.
Fig. 11.
Fig. 12.
Fig. 13.
Fig. 14.
Fig. 15.
INVENTOR
Paul Eisler
BY
ATTORNEY

United States Patent Office 3,026,234
Patented Mar. 20, 1962

3,026,234
LAMINATES OF INSULATING MATERIAL EM-
BODYING ELECTRICALLY CONDUCTIVE PAT-
TERNS AND METHOD AND APPARATUS FOR
PRODUCING SAME
Paul Eisler, 57 Exeter Road, London, England
Filed Jan. 12, 1959, Ser. No. 786,359
Claims priority, application Great Britain Jan. 13, 1958
32 Claims. (Cl. 156—257)

In the production of electrically conductive patterns on or within laminates of insulating material it has been necessary hitherto to provide a gap between adjacent conductive lines or areas so that they should be kept separate and do not touch. These electrically conductive patterns are sometimes thin carbon or graphite coated fabrics but generally they are metallic patterns forming the pathway of an electric current. The by now well known methods and means of the printed circuit technique for instance, provide facilities for making such gaps in conductors such as foils bonded to an insulating support. The insulating support can be very thin and can be sandwiched together with the conductive pattern it carries between the insulating layers of a laminate or be fixed to its surface and the assembly can be united into a single laminated sheet, for instance by heat and pressure if a suitable binder is used. If the sheet is still very thin and flexible and the conductive pattern has been designed for electric heating, the laminate may be called a heating film or heating fabric. The most usual configuration of the conductive pattern in heating films is the meander or zig-zag pattern. It may be described as a column of parallel adjacent arms with links connecting their ends into a continuous coherent line. If, for example, the arms are regarded as stretching from left to right the links on the left hand side connect arms No. 1 to 2, 3 to 4, 5 to 6, etc., while the links on the right hand side connect arms No. 2 to 3, 4 to 5, 6 to 7, etc. Expressed in other words on the left-hand side of the column they connect the odd arm to the following even numbered arm and on the right hand side they connect the even numbered arm to the following odd numbered arm of the meander.

This numbering and designation of arms will be referred to later when the present invention is described in detail because the invention relates in the first instance to electrical resistance patterns and particularly to heating films and fabrics which have a meander pattern. In the second place it relates to spiral coils and stacks of such coils. The method of the invention is also applicable to other metallic patterns of various electrical circuits and circuit elements, such as digital capacitors and switch connections.

The invention practically eliminates the gap between adjacent meander arms (or equivalent conductive elements in other components) and thus produces a heating film or laminate which contains no inactive areas and in which no temperature difference arises from a difference of total foil and total surface area. A slightly higher foil temperature is caused in laminates of the invention practically only by the fact that the foil is embedded in or covered with insulating layers in a special way.

The invention also provides a patterning process with no removal of conductive material or scrap unless and in so far as perforations are provided for special purposes. It permits advantageous, simple and particularly low-cost production and includes a method and means for the mass manufacture of the films in web form that is in considerable lengths which can be rolled up and which are made from material drawn from the roll. Further advantages of the invention will become apparent from the following description.

Broadly stated the method according to the invention for the production of a laminate of insulating material embodying an electrically conductive pattern comprises the steps of making a first sequence of cuts in a thin electrically conductive sheet, the cuts of the first sequence being spaced from one another side by side and only partially delineating the desired pattern without involving the removal of conductive material and without separating the conductive sheet into pieces, interleaving a first thin insulating sheet so that it passes alternately under and over the portions of the conductive sheet between neighbouring cuts, said insulating sheet extending at least substantially to the ends of the cuts, consolidating the interleaved structure consisting of the conductive sheet and said first insulating sheet, making a second sequence of cuts, the cuts of this second sequence being spaced from one another side by side, overlapping the first sequence, and serving in conjunction with the first sequence to complete the delineation of the pattern without involving the removal of conductive material and without separating said interleaved structure into pieces, interleaving a second thin insulating sheet so that it passes alternately under and over the portions of said interleaved structure between the neighbouring cuts of the second sequence, said second insulating sheet extending at least substantially to the ends of the second sequence of cuts, and then consolidating the whole structure.

The invention also includes the laminate as such consisting in a laminated insulating material embodying a thin electrically conductive pattern presenting a continuous pathway between terminals and incorporating adjacent arms with their edges at least in part contiguous and at least two thin insulating sheets which pass in repeating order between the contiguous edges of the arms substantially over their whole length and at least one of which insulating sheets is intact where it passes between the contiguous edges of the arms. Thus although the edges of the arms are contiguous and there are no substantial gaps in the area of the conductive pattern within its peripheral outline the adjacent arms are effectively insulated from one another because at least one of the insulating sheets presents an unbroken barrier between contiguous edges of the adjacent arms.

In applying the method to the production of a meander pattern using a web, a long length from the roll, of the conductive material, the cuts may extend transversely, the cuts of the second sequence being made between the cuts of the first sequence, and the two sequences respectively severing opposite longitudinal edges of the web. Then the respective insulating sheets can extend beyond the severed edges of the conductive material so that the completed structure has an insulating margin down each longitudinal side. Alternatively the cuts may extend longitudinally in relation to a web of conductive material, the first sequence including two sets of cuts separated in the longitudinal direction and the cuts of the second sequence being between the cuts of the first sequence and longitudinally overlapping the adjacent ends of both sets of cuts included in the first sequence. This system produces meander pathways extending in parallel between margins of the foil constituting busbar terminals. When a web of conducting material is used the various steps may be repeated at regular intervals to produce a structure having a repeating pattern at regular intervals, the repeat being widthwise or lengthwise or both. The completed structure can then be cut into pieces each including a desired number of repeats.

As a general rule in producing a meander pattern the cuts in the first sequence will be at equal intervals and the cuts in the second sequence come midway between them so that all the foil arms are of the same width. The links joining the arms may also be of the same width so that the width of the pathway throughout the pattern is constant. In some cases however it may be desirable to decrease the resistance of the links. Thus when a meander pattern of this character is carrying a current there is a tendency for a concentration to occur at the ends of the arms leading to hot spots. This tendency can be reduced by reducing the resistance in these regions, or in other words making the conductivity per square greater here than in the rest of the conductive pattern. This may be done by making the links wider and folding them over or by plating them or by applying a coating of solder or of conductive material such as graphite. Similarly it may be desired to make the conductivity per square of the terminals higher than the rest of the pattern. It may also be desired to have extra width at every link or at regular intervals to provide terminals. These may be folded over and arranged as explained below so that access can be gained to them so that they can be unfolded for the purpose of making a connection to them, or connection made to them in some other way.

One of the problems presented by a conductive pattern laminated to or within electric insulation particularly if it is of thin metal, that is metallic foil, is that of differential thermal expansion of the foil and the insulating material. The conductive pattern provided by the invention has a certain degree of flexibility due to the various cuts which have been made in it and this will go a long way to accommodate these differences in thermal expansion. But preferably the conductive sheet is crimped with the crimps running substantially perpendicular to the cuts in which case the flexibility is much enhanced and so that differential expansion will cause even less difficulty. It is also important to avoid air or gas bubbles between the conductive sheet and the overlying insulating material because the low conductivity of such bubbles may lead to the development of hot spots. To achieve this end it suffices to use a binder which wets the conductive sheet. It is not essential that it should actually bind the sheet. This is of advantage in the production of certain forms of terminals as will be explained.

Figure 5:
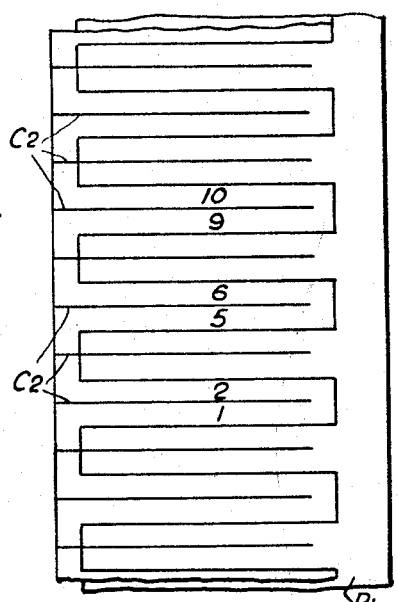
Figure 2:
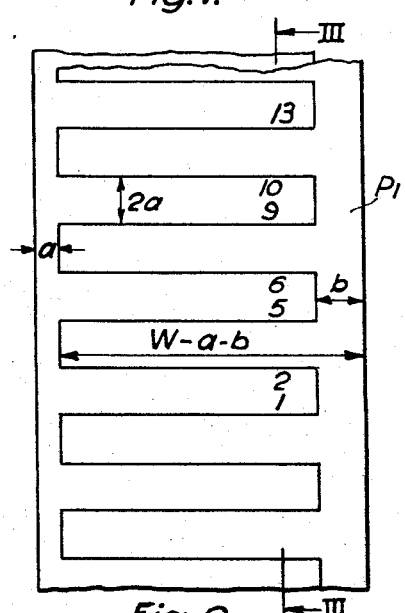
Figure 3:
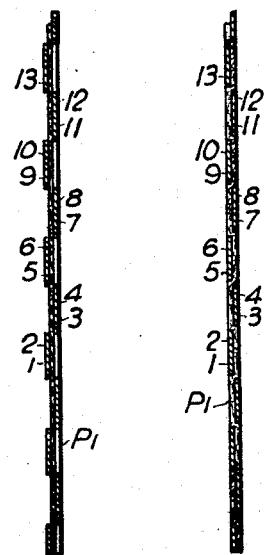
Figure 4:
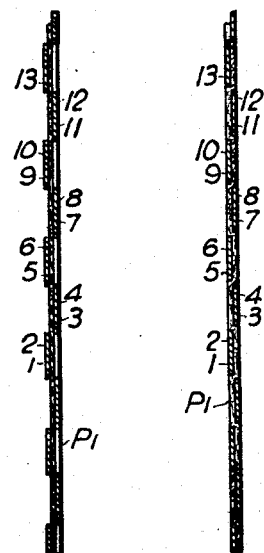
Figure 10A:
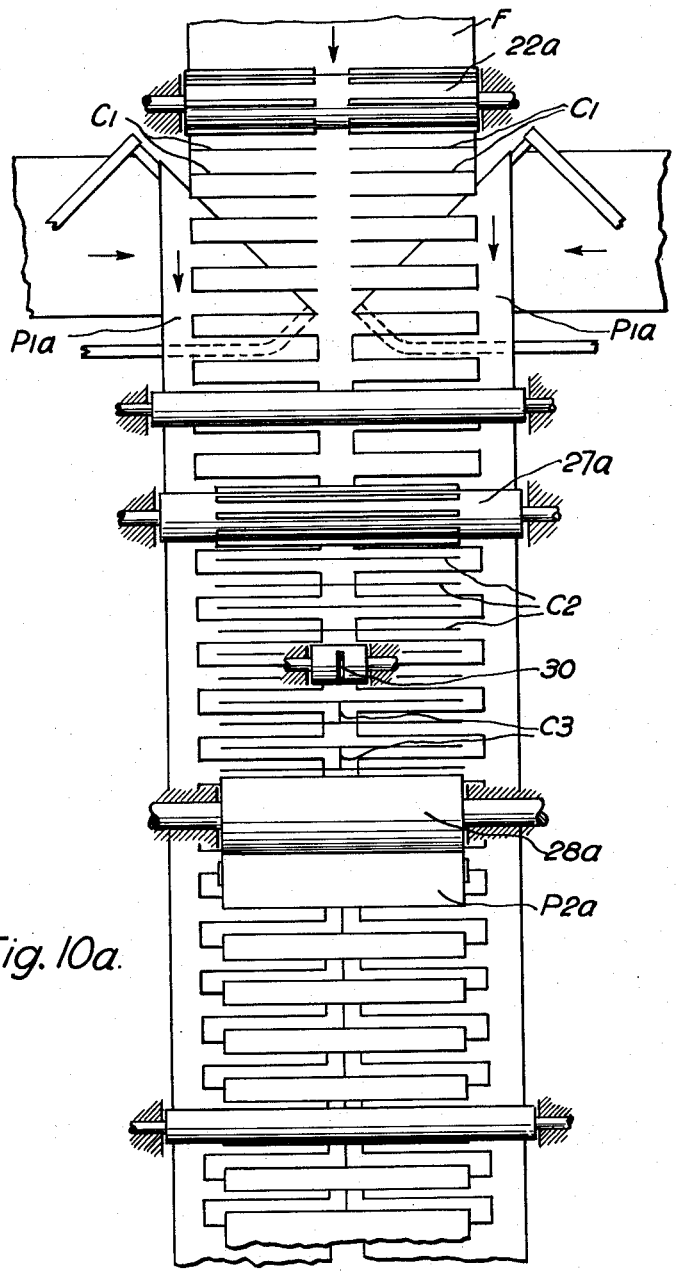
Figure 16:
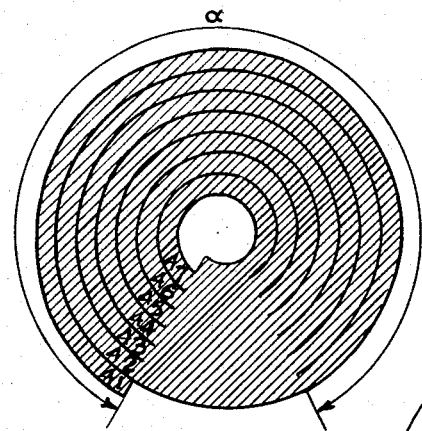
Figure 17:
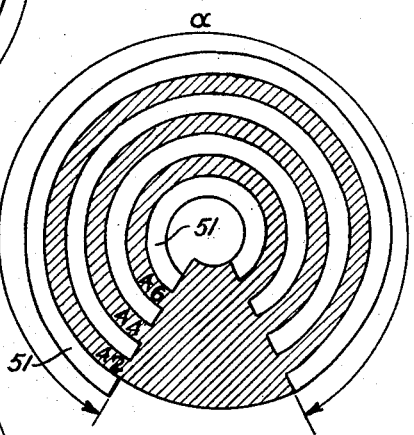
Figure 18:
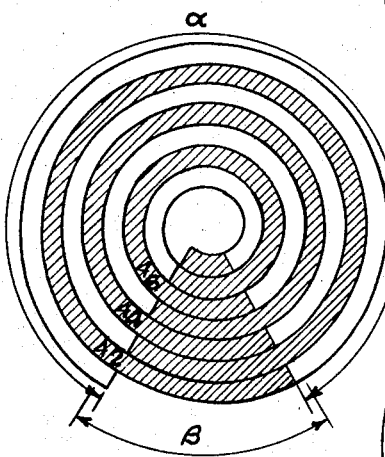
Figure 19:
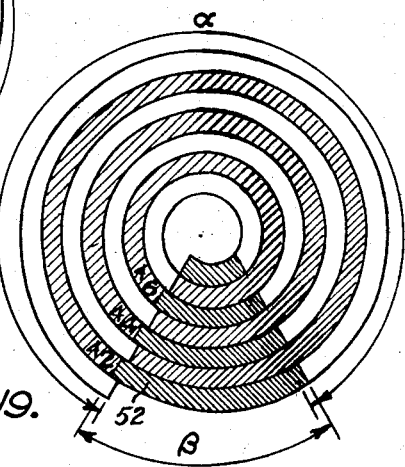

The invention will be further described with reference to the accompanying diagrammatic drawings in which:

FIGURE 1 is a plan view illustrating the first step in the production of a pattern according to the invention from a foil in web form, FIGURE 2 is a plan view and FIGURE 3 a section on the line III—III of FIGURE 2 illustrating the next step, FIGURE 4 is a similar view to FIGURE 3 showing the structure after the next step, FIGURE 5 is a plan view illustrating a step that follows that of FIGURE 4, FIGURE 6 is a plan view and FIGURE 7 is a section on the line VII—VII of FIGURE 6 illustrating the step succeeding that of FIGURE 5, FIGURE 8 is a similar view to FIGURE 7 showing the completed pattern, FIGURE 9 is a plan illustrating the arrangement of a machine for producing continuous lengths of laminate embodying the pattern of FIGURES 1 to 8, FIGURE 10 is a diagram of another form of conductive pattern permitting production in continuous lengths, FIGURE 10a is a view similar to FIGURE 9 of a machine for producing the laminate of FIGURE 10.

FIGURE 11 illustrates the production of a pattern having the meander arms extending longitudinally with respect to a web of conductive material, FIGURES 12 and 13 are sections on the lines XII—XII and XIII—XIII of FIGURE 11, FIGURE 14 is a detail illustrating the provision of folded terminals in the structure of FIGURES 1 to 8, FIGURE 15 is a detail illustrating the provision of folded terminals in the structure of FIGURES 11 to 13, FIGURES 16 to 19 illustrate the production of a pattern of spiral form.

By way of example FIGURES 1 to 8 illustrate the production of a heating film for incorporation into a plastic laminate to be used as a heated wall panel or a free standing radiator. The meander pattern may be made from thin lead foil because it is cheap, and available in the width and thickness required for operation on public supply mains voltage with a resistance value which permits reasonably wide meander arms. For a low voltage supply system aluminum foil is the preferred alternative to lead foil. In the present example paper impregnated with a—preferably modified—phenol formaldehyde resin is used for the insulating layers; the modification permitting the paper to adhere to the foil by merely passing a hot roller over them. Two layers of paper are used to make the heating film which is produced in web form and subsequently cut up into pieces and embedded in a laminate in a standard laminating press.

If the width of the complete heating film desired is to be "W," and there is to be an insulating border of width "b" on both the left and right hand sides of the meander pattern which is to have a width of the arms and links of "a," the necessary width of the foil F is $W-2b$ and the insulating paper layer has width "w" such that $$w = W - a - b$$

The production is carried out in a sequence of steps and it is a characteristic of the invention that the cutting of the foil is done in at least two distinct stages. As will be shown later this enables the film to be produced by a continuous process. First as shown in FIGURE 1 the right hand side of the foil F is cut at the positions between the arms 1 and 2, 3 and 4, 5 and 6, and so on, that is between each odd and following even numbered arm. Each cut C1 starts at the right hand foil edge and goes left up to the left hand side link that is up to a distance "a" from the left hand edge. As the foil width is $W-2b$ the length of the cut is $W-a-2b$.

These cuts C1 leave the arms 2 and 3, 4 and 5, 6 and 7, etc., as portions still coherent over the whole foil width as indicated by the chain lines and every other portion consisting of a pair of coherent arms is now slightly lifted relative to its adjacent portions, so that the first insulating layer P1, in this example a sheet of impregnated paper, of width "w" can be interleaved. The paper is put in right up to the ends of the cuts, that is up to the links, distance "a" from the left hand foil edge; it consequently extends beyond the right hand foil edge by the distance b.

The structure at this stage is illustrated by FIGURES 2 and 3.

Before the next cutting stage, this structure is consolidated by pressure for example by going over it with a hot roller which compresses it into practically one plane—the insulating layer and the foil being very thin. The paper remains intact between the portions of foil. Preferably the foil and paper are caused to adhere together by the very short heat and pressure cycle applied by the roller. (Alternative means will be referred to later.) The structure is now as in FIGURE 4.

The next two stages are basically symmetrical to the above described first two. Thus in the next or third stage shown in FIGURE 5 cuts C2 (of $W-a-2b$ length) are made in the foil and paper structure starting from the free left hand edge of the foil and reaching just to the right hand links. The cuts are midway between the cuts C1 that is between the meander arms 2 and 3, 4 and 5, 6 and 7, etc., and go through foil and paper.

The procedure of the fourth stage is similar to that of the second. Another impregnated paper P2, similar to the first insulating layer P1 is interleaved between the portions consisting of the pairs of arms 1—2, 3—4, 5—6, 7—8, etc., which have just been cut. These pairs, however, comprise meander arms already severed from each other over the length of the first cuts C1, but rendered mechanically coherent and easily handled by the adherent interleaved first paper P1. The structure thus attained is shown in FIGURES 6 and 7 and the structure is then consolidated by heavy application of a hot roller to produce a final structure substantially as in FIGURE 8. This structure is a thin practically flat film having a thickness of three layers but with every arm of foil insulated from every other arm because the paper passes between contiguous edges of the arms in a repeating order and at least one of the papers remains intact where it passes between the edges of the foil. This four stage production schedule can be carried out fully automatically and continuously on a web feeding machine at high speed. No human labour is involved in the operations.

The machine has three stock rolls, one for the foil and one each for the two insulating layers to be interleaved. The cutting can be done while the foil is running steadily or intermittently. In the latter case a loop is arranged both in front and after the intermittent motion stage. The scheme described above with reference to FIGURES 1 to 8 applies substantially unchanged. A similar machine can be used to produce a pattern with the cuts in the longitudinal direction. This latter alternative will be described later.

In the cross cutting machine illustrated by FIGURE 9 the foil F passes from the stock roll 21 through a cylindrical cutter 22 to the first interleaving stage. In this stage the alternate pairs of meander arms are lifted one by one (by means not shown) for example a pneumatic device or temporary adhesion of a spot of pressure sensitive adhesive printed or otherwise applied to the foil at appropriate positions. Such lifting means are known per se from the printing arts. Since the arms extend right to the right hand edge, these alternate pairs of arms can be lifted over an entry roller 23 guiding in the first interleaving layer P1 coming continuously from the stock roll 24. This roller 23 is of small diameter with its axis parallel to the foil plane but at an angle to the foil length suitably an angle of 45°. It is positioned on horizontal supports such as 25 directly in the opening between the lifted and non-lifted pairs of meander arms. The first interleaving layer P1, say of impregnated paper, is fed from a stock roll 24 to this roller 23 from the side, at the appropriate angle, here at a right angle to the foil feed direction, and is turned by the roller into the feed direction. At the same time the edge of the paper is positioned just at the distance "a" from the left hand foil edge, that is the paper is carried in to the ends of the cuts.

Having passed over the roller 23 the lifted pairs of meander arms are brought back on to the web which passes between a heated pair of rollers 26 to be consolidated. This continuous web version of the first and second stage of the production sequence described above with reference to FIGURES 1 to 8 is repeated in very similar manner on the other side of the web for the third and fourth stages, using a second cutter 27, an interleaving layer P2 coming from a stock roll 28 and an entry roller 29 followed by heated consolidating rollers 31. The product is an endless heating film with insulated borders and all meander arms in series. Assuming the arms to be numbered as in FIGURE 8, the even numbered meander arms are sandwiched between the two insulating layers while the odd numbered are accessible. Arms 1, 5, 9, 13, . . . are on one side and arms 3, 7, 11, . . . are on the other.

It would be possible to vary the cross cutting scheme to provide integral connection of groups of arms in parallel.

For example as shown in FIGURES 10 and 10a the first sequence of cuts C1 may consist of a succession of two cuts in line respectively extending from opposite edges of the foil web F produced by cylindrical cutter 22a, while the cuts C2 come between the cuts C1 as before and are produced by cylindrical cutter 27a. Two insulating sheets P1a are inserted from opposite sides similarly to the sheet P1 in FIGURE 9. This can be done continuously. The second sheet P2a has to be inserted between pairs of arms which are connected at both ends of the web. To enable this to be done continuously cuts such as C3 may be made at intervals by a cylindrical cutter 30 enabling the double arms to be folded clear while a continuous sheet is run in from a stock roll 28a located above. No insulation between these ends when they are folded back is necessary because the two meander patterns so produced are in parallel with corresponding links along the centre of the web at the same potential. For the same reason it is unnecessary to ensure that when folded back there is good contact again between the links along the severed lines C3. These lines should be midway so that the links are of equal width. In the case of those double arms which do not have to be lifted there need be no cut C3 and plain areas are left therefore which can serve as terminals. Pieces of the pattern can be severed across lines such as 32, leaving a convenient terminal area at the centre and two meander patterns in parallel extending to the other end of the severed piece. Other and more elaborate schemes are possible.

For parallel "repeat" meander patterns the longitudinal cut variety of production is much preferred however. This method can produce a heating film with busbars along the foil edges between which there are groups of meander lines which are all in parallel, and is very suitable for applications to panels, wall and ceiling papers and to any surface to be heated at a given wattage per unit area. Any length which is a multiple of these "repeats" can be cut off and be connected to the supply terminals without provision for a return line. The scheme permits mass production of elements of wide application, that is heating films which have individually variable series-parallel connections and can thus be fitted to many devices, including panels, not required in a quantity warranting production of a special heating film. The limit of usefulness of the purely parallel connection type of this variety is set by dimensional consideration and the resistance value obtainable in a repeat, as the meander arms cannot be made too narrow or too long. It is therefore particularly suitable for heating films for low voltage supply.

The machine producing the longitudinal cut variety is simpler to construct when it is run with intermittent motion in steps of double repeat length. When regularly spaced perforations are made for example for convenience in measuring out lengths of film the interval between perforations may be an integral submultiple of the length of the steps.

In the following the single series of meander arms between the busbars is referred to as "repeat." Actually the direction of the arms in subsequent repeats is exactly opposite to that in the preceding repeat so that in the preferred arrangement a double repeat length contains two symmetrical instead of two identical "repeats."

The principle of operation strictly follows the invention as defined above and is analogous to the four stages of the production sequence outlined earlier with respect to transverse cuts, but with the cuts here in the longitudinal direction.

If "a" is again the width of the meander arm it can be said that the length of all cuts is $2l-2a$ where $2l$ is the length of a double repeat. There are often $2n$ meander arms in each repeat between the busbars on the two foil edges. If the busbars are to remain accessible on the same side of the film however the number of meander arms between them is $2n-1$. The busbars usually have a width greater than "a." "n" can be any even number.

In the first station shown in FIGURE 11 the web of foil F which comes from a stock roll not shown is cut by a slitting cutter 35 at C1 between busbar B and arm 1, between arms "2 and 3" "4 and 5," and over lengths $2l-2a$ with an interval of $2a$ between their adjacent ends. At each step of $2l$ another such row of cuts C1 is made so that there is a space $2a$ between the ends of successive cuts in the longitudinal direction. The slitting cutter 35 is lifted at appropriate intervals to leave the spaces $2a$. In the second station a sheet of insulating material P1 is pushed into the pocket opened by gently lifting the alternate double length portions each consisting of a pair of meander arms between the cuts, the web and the insulating sheet being relatively at rest in the feed direction of the web during this operation. The cross section of the web structure is now as indicated in FIGURE 12.

The insulating layer may come from a stock roll and be cut off during the interleaving operation at a length of preferably $w+2b$ (foil width plus twice the insulating border) so that it overlaps each margin of the foil by the amount $b$, or it may be taken from a pile of sheets by means well known in the printing arts. If it is desired to have part of the width of these busbars bare on the same side as this insulation, the length of the insulating sheet is made smaller than "$w$" but larger than "$w$" minus the width of both busbars. The direction in which in this context the "length" dimension of the insulating layer lies is at right angles to the length direction of the foil or web, while the "width" of the insulating layer is in the web direction. This width is less than the length $2l-2a$ of the cuts made in the foil only by the slight clearance required at the ends of the cuts.

The layer P1 is usually impregnated or coated paper which sticks to the foil after the web on passing to the third station is consolidated by a pair of hot rollers such as 33 or equivalent bonding means.

The third station in which the second group of cuts C2 is made by a second slitting cutter 36, is positioned an odd number of single repeat lengths (here 3 such lengths centre to centre) down the length of the web from the second station. This cutter 36 is also lifted at appropriate intervals to leave the spaces between successive cuts. As a result the second sequence of cuts C2 made at this station, which are of the same length $2l-2a$ as the cuts C1 and displaced laterally so that they are made between the cuts C1 are staggered relatively to the cuts C1 by the distance $l$, and longitudinally overlap two sets of adjacent cuts C1 equally. Relative dimensions only are here referred to; the absolute dimensions are easily adjustable on the machine so that any foil, insulating layer and cutter can be used.

The cuts C2 are midway between meander arms 1 and 2, 3 and 4, 5 and 6, etc. The cutting is followed by the lifting of the portions 2—3, 6—7, 10—11, etc., out of the web plane and the placing of the second sheet P2 of insulating layer into the pocket thus formed. This (fourth) interleaving stage is again completed by the web passing through hot pressure rollers such as 34 or equivalent bonding means.

It will be seen again that with this longitudinal cut scheme the cuts are made in two distinct stages and it is this which makes possible the introduction of the insulating sheets. Seen from the edge of the foil the two sequences of cuts overlap and it would therefore be impossible to effect the insulation by a single insulating sheet. On this longitudinal cutting machine the feeding of both sets of interleaving sheets P1 and P2 can be done from the same side of the web and can be effected at the same place as the cutting operation so that the first and second stage can be carried out at one station instead of two as shown for clarity, and the third and fourth stage at another. As the web stops during the operations, the cutting tool itself can be arranged to lift the alternate portions of material while the other portions of material are held down on the die plate by separator strips fixed to points well outside and in front of the double repeat length. The lifting can be done by ejector pins or strips slidable vertically in the tool and positioned between the cutters at centres opposite the portions to be lifted. These ejectors are perforated and connected to a suction pipe and can thus by pneumatic means hold the portions lifted until the interleaving sheet has been inserted into the pocket by an arm, also operating by the aid of pneumatic "fingers." Then the ejector releases the lifted foil portions, lightly pressing them down, and the web movement slides this partly completed laminated film out of the tool and hold down strips.

Instead of using pneumatic and/or mechanical (tooling) means to lift and/or hold down the respective portions, pressure sensitive spots of adhesive can be provided at the respective places on one or both sides of the foil by printing or other suitable means and the portions be picked up or held down by temporary adhesion.

When the pattern produced by the invention is laminated between further insulating sheets so that it is completely covered on both sides, provision must be made for connection to the terminals of the pattern or for access to them for this purpose. There is not only the problem of making the actual connections but also of locating the terminals and avoiding damaging the pattern by cutting and the latter arises especially where the laminate is made in large pieces which are afterwards cut up. To enable a variety of sizes to be cut from the same laminate the pattern may as above mentioned include repeats lengthwise and widthwise based on a conveniently small module (unit size) and the boundaries or other similar data may be marked on the back of the laminate during manufacture to indicate at least the cutting of the pattern and the position of the terminals as a guide to ensure that the material is cut along the correct lines and as a guide to the location of the points at which connection is to be made. Since such indications will register with the position of the terminals, no question of cumulative error can arise as might be the case when measurement has to be made from one end of the large piece of laminate.

The invention provides several constructions and arrangements of terminal which facilitate the making of connections.

The first is the provision of folded over areas of foil so that when located and exposed they can be pulled out of the confines of the laminate. For example as shown in FIGURE 14 which is a transverse section, in a pattern of transverse cuts, the margins of the foil web may be doubled over at 35. This may be done before consolidation by any convenient known folding means. There will thus be formed a folded over terminal area on every link connecting together two arms of the meander pattern.

As shown in FIGURE 15 which is a longitudinal section, in a pattern of longitudinal cuts and marginal busbars or terminals, transverse folds may be made after the fashion of that shown at 36. These folds are provided at intervals corresponding to the smallest unit to be provided for and if the film is severed along the midline, the pieces so severed will be left at both ends with a double folded tab forming a terminal.

To gain access to folded terminals the composition of the overlying layers in these areas can be such as to produce a brittle region in the finished article which can readily be broken away. The composition which produces the brittle material should also be such that it does not bond to the foil. Alternatively the layer laminated over the pattern is apertured at these areas of the terminals so that when the lamination is completed, the terminals are exposed at the bottom of the apertures. The apertures can be temporarily filled with some easily removed composition which may moreover be coloured for easy location. With either of these arrangements when the foil has been exposed the folded over tab is unfolded and can thus be drawn outside the laminate. The folded tab is preferably crimped so as to give it additional flexibility.

A folded tab may also be used where it is desired to use a flat push-in connector which pushes into a slot in the edge or face of the laminate. To form the slot a removable insert can be moulded in against the tab and to ensure that the insert is removable and is not bonded it may be coated with graphite or talcum powder or silicone grease or it may be made of a material which will not bond to synthetic resin or the like, for example polytetrafluoroethylene. It will be understood that the insert is only removed at those terminals to which connection is to be made.

Another possibility is to arrange the pattern so that all the terminals appear on the same surface and to laminate an additional insulating sheet (or more than one) only on the opposite surface, leaving the surface to which connections are to be made bare. The material so prepared is sent out with a separate insulating sheet which may form a decorative surface layer, which can be stuck on after the connections have been made. Such separate sheet may itself be a thin laminate say of paper and synthetic resin and it may be coated with a heat-setting pressure-sensitive adhesive.

As above mentioned in a meander pattern consisting of straight, closely spaced arms with links at the ends of the same width, there is a tendency for the current to be concentrated along diagonal lines leading to the development of hot spots at the ends of the arms that is at the regions adjacent the ends of the cuts by which adjacent arms are separated. The development of such hot spots can be countered in two ways which can be used alone or in conjunction. The conductivity in the region of the links may be increased for example by making the links wider than the arms of the pattern and folding them over or by applying a solder coating or plating for example with copper or applying a coating of conductive material such as graphite. The other possibility is to increase the resistance along the diagonal lines where the current tends to concentrate for example by thinning the foil or making holes in it appropriately distributed.

To avoid the terminals becoming too hot, they also may have their conductivity increased in the same manner as described above for the links.

FIGURES 11 to 13 exemplify the purely parallel type of the longitudinal cut "repeat" pattern. The usefulness of the longitudinal cut variety can be increased substantially by cross cutting between the repeats and severing selected links and thus effecting various series and series parallel combinations of the repeats or of parts of the repeats. For such universal patterns or uses the busbars can be made of the same width "a" as the meander arms or one of meander arms in the centre of the foil and/or the cross links common to adjacent repeats may be made slightly wider. When the links are severed they are taped by an adhesive tape to prevent contact between the cut ends. Alternatively a hole or a slot may be made.

Whenever a go and return path of the current is desired to a pair of neighbouring terminals as in many heating films and most space heating applications, the longitudinal cut repeat pattern is preferred, having its repeat extending over approximately half the foil width and connected in parallel by the two edge and one centre busbars and/or connected in series by cuts across less than half the foil width between the repeats.

In heating films of the invention perforations are sometimes required, mainly for two reasons:

(a) A perforated heating film may be wanted for application to acoustic panels (ceiling panels for instance) or for better bonding of the layers between which the film is finally laminated. Another reason is the requirement to have the heating film permeable to air, vapour, liquid or powders in various heating devices such as in drying films described in my application Serial No. 783,609, filed December 19, 1958. Usually the required perforations can be made in the film during production. When the film is perforated prior to or at the first stage of one production sequence a second punching operation arranged after the fourth stage and in register can provide smaller diameter holes in the interleaving layers and thus leave an insulating ring round the hole. If the film is already enclosed and the insulating layers are resistant to a mordant of the foil, the "halo" can be created by putting the film which was only perforated after processing into an etch bath or anodizing bath. Alternatively the halo can be produced by burning out by means of a spark discharge. This is done by placing a pin or wire brush connected to a high voltage source in the hole. Wherever permissible however, the simplest method is to seal the perforations by a coat of insulating varnish, sufficiently thin to leave the holes unclogged while covering their walls.

(b) When the heat distribution over the whole film area requires slight adjustments by variation of the local ohmic resistance of the foil pattern; often the need for adjustment only arises on installation of a panel which may receive uneven radiation from an external source; and this uneven heating may have to be compensated by a reciprocally uneven heat generation by the heating film. Small perforations at the required places are in this case the preferred means to increase locally the resistance of the foil, and local tinning (by a standard soldering iron for instance) is the preferred means to lower the resistance of the foil. Adjustment of patterns for higher temperature work is done by local plating of suitable metals (copper, nickel) by means of a tampon or "doctoring" process, for instance the process known as "Dalic" plating, marketed by the Metachemical Processes Limited, Crawley/Sussex. For bare patterns local increase in resistance may also be effected by local abrasion. However, only the perforating method can be easily carried out when the critical region on the bare foil surface is not directly accessible and it is—particularly for individual cases of adjustment—a very convenient method.

In the foregoing it has always been assumed that the interleaved insulating layers and the foil will adhere by the brief pressure of a hot roller or by use of another nearly instantaneous bonding process. Among the latter the crimping of both foil and interleaving paper is a preferred example. It is carried out by passing the film through two engraved heavy pressure rollers. The resulting crimping improves the bonding of the film in some final laminates and improves the film in various mechanical and heat dissipation aspects if it is used with a thin cover coat only.

When the longitudinal cut film is used as a resistor in place of a wire wound resistor in electronic or electrical equipment the preferred foil used in its production is a cupro-nickel foil (55 percent Cu, 45 percent Ni) and the busbars are tinned. The pattern is arranged as an endless go and return pattern each covering half the foil width. The film can be supplied in reel form and can be cut automatically or by hand into any of a prearranged set of values.

A structure having a repeating pattern lengthwise can be a tape, that is to say a material the width of which does not exceed two inches.

The cross cut film is for the same purposes used in pairs in order to bring the terminals close together. The first meander arm of each film is joined to a terminal, both films are cut off and their other ends joined together. This can also be done automatically from two reels or one reel of already paired meanders, and it can be prefabricated.

There is no restriction on the variety of resistance values obtainable. Adhesive tape and metal foil backed adhesive tape can be used as an enclosure for the film.

In applying the invention to spiral coils to be cut out of a sheet of foil or thicker metal the feature of "no scrap" has to be understood as no scrap from the area of the metal sheet between the innermost and outermost turn of the spiral. This annular form area may be the "blank" to be fed into the press tool in which the cutting and interleaving is done. The four stages of processing are the same as for the meander pattern, but naturally the shape and division of the cuts as well as the shape of the interleaving insulating sheets are different. The first and second stages (and the third and fourth stages) may be carried out at the same station with the aid of the respective cutting tool in a similar way to that described previously for the longitudinal cut meander pattern. In analogy to the pattern that part of the spiral conductor may be called the portion of a turn, which is separated from the portion of the next turn by the cut line into which an insulating layer is squeezed.

The first cutting tool cuts all spiral lines which are within the first sector of the coil. This sector is desirably more than 180°, preferably over 300°. As the metal sheet to be cut is not too thick or is a foil the tool can be made like a paper board cutting tool or on the known lines of universal or easily set up tools. It not only cut all lines within the sector $\alpha°$, FIGURE 16, but also lifts up the parts of the even numbered portions (or turns) 42, 44, 46, within the sector by apertured ejector pins which are connected to a suction line. The odd numbered portions (turns) 41, 43, 45, 47 are kept on the bottom tool or on the material forming the bottom plate, also by suction. This bottom tool is perforated and the perforations are connected to the suction pump. The perforations registering with the odd numbered portions are open, the others are closed. Opening the tool after the cut while the "vacuum" is "on," splits the $\alpha°$ sector of the spiral and a thin insulating layer 51, a disc of the shape of the $\alpha°$ sector, is interleaved, FIGURE 17. The ejector pins of the top tool then press the even numbered portions back and can often substantially flatten the sector with the insulating layer squeezed between the turns. A brief application of heat and pressure completes the consolidation and the second stage.

The third and fourth stage are carried out in another press tool which works like the tool of the first two stages but over the sector $\beta°$ instead of $\alpha°$. $\beta°$ extends over the sector not previously cut and is slightly larger than $360°-\alpha°$; this ensures overlap, see FIGURE 18. The second tool has also a provision for registering its cut.

The fourth stage in which another insulating sheet 52 is interleaved is also like the second and it is readily seen that the entire production can be completely mechanised by automatically feeding the two press tools.

It will be clear that the method is not confined to spirals of circular contour but is equally applicable to square or other contours.

As the process is quite suitable for producing spiral coils (and other patterns) of any shape not only from foil but from somewhat thicker sheets as well, it may be desirable in some cases to control the cut edge and reduce the width of arm by the thickness of the interleaved insulating layer. This can be done by crimping or slightly bowing the cut metal portions with the crimps or axis of bowing running parallel to the cuts before the insulating sheet is interleaved.

As coils produced by the invention have a high "Q" and a good space factor, they can be used advantageously in high frequency circuits and in stacks round iron cores.

Having described meander and coil patterns it can be readily understood that the process is applicable to other configurations as well as long as they retain a mechanical structure which can be sufficiently consolidated by thin interleaved insulating layers, such as resin impregnated paper or fibres and plastic films.

A principal use for the laminates according to the invention is as heating films for which purpose the meander pattern is generally the most useful. For this purpose the invention provides an alternative construction to those described in my copending applications Serial Nos. 747,314, now Patent No. 2,971,073, and 747,315, both filed July 8, 1958, 749,554, filed July 18, 1958, 783,633, filed November 10, 1958, and 783,609 and 789,221, both filed December 29, 1958, and it can be used for the same purpose, e.g. space heating, radiators and wall and ceiling panels, heating of food and in some cases also for drying.

In the case of a heating film it should be mentioned that the conductive pattern can be used to produce the necessary heat for curing the interleaved insulating sheets and the film can also be used for heat curing further layers which may be laminated to the heating film. Care must be taken however that bubbles of vapour are not trapped in the laminate. This may be done by choice of the material to be cured (that is epoxy resins) and to some extent where otherwise permissible by perforations which allow vapour to escape.

I claim:

1. A method of producing a laminate of insulating material embodying an electrically conductive pattern which comprises the steps of making a first sequence of cuts in a thin electrically conductive sheet, the cuts of said first sequence being spaced from one another side by side and only partially delineating the desired pattern leaving intact the quantity of conductive material and leaving the conductive sheet in one piece, interleaving a first thin insulating sheet so that it passes alternately under and over the portions of the conductive sheet between neighbouring cuts, said insulating sheet extending at least substantially to the ends of the cuts, consolidating the interleaved structure consisting of the conductive sheet and said first insulating sheet, making a second sequence of cuts, the cuts of the second sequence being spaced from one another side by side, overlapping the cuts of the first sequence, and serving in conjunction with the first sequence to complete the delineation of the pattern leaving intact the quantity of conductive material and leaving said interleaved structure in one piece, interleaving a second thin insulating sheet so that it passes alternately under and over the portions of said interleaved structure between the neighbouring cuts of said second sequence, said second insulating sheet extending at least substantially to the ends of the second sequence of cuts, and then consolidating the whole structure.

2. A method as set forth in claim 1 wherein the conductive sheet is of metal foil and the insulating layers incorporate an insulating substance which is fused by heat at a lower temperature than will damage the foil and the consolidation is effected by pressure accompanied by the application of heat whereby said substance is fused and wets the metal foil.

3. A method as set forth in claim 1 in which both sequences of cuts extend transversely in relation to a web of the conductive material, the cuts of the second sequence being made between the cuts of the first sequence, and the two sequences respectively severing opposite longitudinal edges of the web.

4. A method as set forth in claim 3 in which said insulating sheets respectively extend beyond the severed longitudinal edges of the conductive sheet.

5. A method as set forth in claim 1 in which the cuts extend longitudinally in relation to a web of the conductive material, the first sequence including two sets of cuts separated in the longitudinal direction and the cuts of the second sequence being made laterally displaced in relation to and in between the cuts of the first sequence and longitudinally overlapping the adjacent ends of both sets of cuts included in the first sequence.

6. A method as set forth in claim 1 in which the cuts in the first sequence are at equal intervals and the cuts in the second sequence are made midway between the cuts of the first sequence so that all the arms produced by the cuts are of the same width.

7. A method as set forth in claim 6 in which the conductivity of the conductive sheet is increased in the links connecting adjacent arms at the ends of the cuts.

8. A method as set forth in claim 1 in which said first sequence of cuts extend over more than half of a spiral pattern and said second sequence completes the spiral pattern.

9. A method as set forth in claim 1 in which the conductive sheet is a crimped foil with the crimps lying substantially perpendicular to the cuts.

10. A method of producing a laminate of insulating material embodying an electrically conductive pattern which comprises repeating the steps of claim 1 at regular intervals in relation to a web of conductive sheet thereby producing a structure having a repeating pattern at regular intervals which can be cut into pieces each including a desired number of repeats.

11. A method as set forth in claim 10 in which the pattern is repeated both widthwise and lengthwise of the web.

12. A method as set forth in claim 1 including the further steps of folding over portions of the conductive sheet at intervals, covering said portions with a material which a binder wets but to which the binder does not adhere, and laminating the structure between insulating sheets by means of said binder.

13. A method according to claim 1 including the further steps of folding over portions of the conductive sheet at intervals, laminating the structure between insulating sheets by means of a binder of low cohesive strength so that the binder and insulating substance in the region of said folded over portions form with the conductive sheet a bond which can be readily broken without substantial damage to the conductive sheet and thus permit access to the folded over portions.

14. A method as set forth in claim 1 including the further steps of bonding the whole structure on one side to an insulating sheet leaving the other side of the structure exposed, making electrical connections to the conductive pattern at desired points, and thereafter laminating another insulating sheet to said exposed side.

15. A laminated insulating material embodying a thin electrically conductive pattern presenting a continuous pathway between terminals and incorporating adjacent arms with their edges at least in part contiguous, and at least two thin insulating sheets which pass in repeating order between the contiguous edges of the arms substantially over their whole length and at least one of which insulating sheets is intact and presents an unbroken barrier where it passes between the contiguous edges of the arms.

16. A laminated structure as set forth in claim 15 in which the first of said insulating sheets separates a first set of alternate contiguous edges, passing alternately under and over successive portions each consisting of a pair of adjacent arms, and the second of said insulating sheets separates the contiguous edges which lie between said alternate contiguous edges of said first set, said second insulating sheet passing alternately under and over successive portions each consisting of a pair of adjacent arms between the contiguous edges of which said first insulating sheet passes.

17. A laminated structure as set forth in claim 15 in which said pathway is of meander form.

18. A laminated structure as set forth in claim 17 in which the pattern is a single meander with the arms extending from edge to edge of the structure and with the insulating sheets extending at least to the respective edges of the meander pattern.

19. A laminated structure as set forth in claim 17 in which the pattern consists of a plurality of meanders extending between terminal areas along the two longitudinal edges of the pattern.

20. A laminated structure as set forth in claim 17 in which the meander pattern comprises links interconnecting arms and in which said arms and at least parts of the terminal areas have a higher conductivity than the remainder of the conductive pattern.

21. A laminated structure as set forth in claim 15 incorporating a plurality of similar interconnected conductive patterns each having terminal areas and each occupying an area of the same size and form so that the structure can be cut up into pieces each containing one or more such areas of interconnected conductive patterns including terminal areas.

22. A laminated structure as set forth in claim 21 in which the similar interconnected patterns are repeated both lengthwise and widthwise of the structure.

23. A laminated structure as set forth in claim 15 wherein said pathway is of spiral form.

24. A laminated structure as set forth in claim 15 in which the insulating sheets overlying the terminals at least on one side incorporate areas containing easily removable material adjacent to the terminals to enable access to be obtained to the terminals.

25. A laminated structure as set forth in claim 24 in which the terminals are formed of folded over portions of the conductive pattern.

26. A laminated structure as set forth in claim 15 having both terminals appearing on the same surface of at least one insulating sheet and having at least one further insulating sheet laminated on the opposite surface to that on which the terminals appear.

27. A laminated structure as set forth in claim 15 embodying a repeating pattern, the structure also comprising additional layers of material covering the patterns and means on one external surface indicating at least the positions of the terminals, the means being in register with said positions.

28. A laminated structure as set forth in claim 15 in which the conductive pattern is of metal foil.

29. A laminated structure as set forth in claim 28 in which the metal foil is crimped with the crimps substantially perpendicular to the arms of the pattern.

30. Apparatus for producing a laminate of insulating material embodying an electrically conductive pattern, including means for longitudinally feeding a conductive sheet in web form, means for making sequences of spaced cuts in the web, means for temporarily raising alternate portions of material lying between successive cuts and for temporarily holding down the portions lying between the raised portions, means for introducing an insulating sheet from the side and passing it between the raised and held down portions, and means for consolidating the interleaved portions and insulating sheet.

31. Apparatus as set forth in claim 30 in which the cuts are made transversely in relation to the direction of the feed of the conductive sheet, and said means for introducing the insulating sheet include a small diameter roller set at an angle to the direction of the feed of the conductive sheet so as to redirect the insulating sheet coming in web form in a transverse direction, into the direction of feed of the conductive sheet.

32. Apparatus as set forth in claim 30 in which the cuts are made longitudinally in relation to the direction of feed of the web, and said means for introducing an insulating sheet pushes the insulating sheet in a direction transverse to the conductive sheet, between the raised portions and the held down portions of the conductive sheet, the conductive sheet and sheet being relatively at rest in the feed direction of the conductive sheet during the introduction of the insulating sheet.

References Cited in the file of this patent

UNITED STATES PATENTS

| | | |
|---|---|---|
| 1,996,522 | Norris | Apr. 2, 1935 |
| 2,110,660 | Doczekal | Mar. 8, 1938 |
| 2,203,620 | Smith | June 4, 1940 |
| 2,457,616 | Van Dyke et al. | Dec. 28, 1948 |
| 2,504,146 | Mossin | Apr. 18, 1950 |
| 2,512,875 | Reynolds | June 27, 1950 |
| 2,600,486 | Cox | June 17, 1952 |
| 2,777,930 | Nathanson | Jan. 15, 1957 |
| 2,849,582 | Van Der Perk | Aug. 26, 1958 |
| 2,887,558 | Tally | May 19, 1959 |
| 2,953,670 | Kelly | Sept. 20, 1960 |